United States Patent [19]

Hough et al.

[11] 4,393,754
[45] Jul. 19, 1983

[54] AIR DEFLECTION ASSEMBLY FOR VEHICLE SUNROOFS

[76] Inventors: Louis E. Hough, 22448 Statler, St. Clair Shores, Mich. 48081; Walter J. De Vigili, 16082 Dugan Rd., Roseville, Mich. 48066

[21] Appl. No.: 195,151

[22] Filed: Oct. 8, 1980

[51] Int. Cl.³ .............................................. B60J 7/00
[52] U.S. Cl. .................................... 98/2.14; 296/217
[58] Field of Search ................... 296/217, 218; 49/394, 49/465; 98/2.14, 2.11; 292/207; 244/129.3, 121

[56] References Cited

U.S. PATENT DOCUMENTS

| | | | |
|---|---|---|---|
| 2,159,516 | 5/1939 | Ball | 98/2.14 |
| 2,987,979 | 6/1961 | Hezler, Jr. | 98/2.14 |
| 3,904,239 | 9/1975 | Jardin | 296/217 |
| 3,972,558 | 8/1976 | Horn | 296/218 |
| 4,291,912 | 9/1981 | Fox et al. | 296/217 |

*Primary Examiner*—Richard A. Bertsch
*Attorney, Agent, or Firm*—Krass, Young & Schivley

[57] ABSTRACT

An air deflection assembly particularly adapted for use with vehicle sunroofs includes a substantially planar, air deflecting member pivotally mounted in spaced relationship to a leading edge of an opening in the vehicle's roof. A support comprising a pair of spaced, parallel rods has the opposite ends thereof respectively pivotally connected to the deflection member and a frame surrounding the periphery of the sunroof opening to define a pair of transversely extending pivot axes which permit adjustment of both the elevation and inclination of the deflection member. In an elevated position above the vehicle's roof, the deflection member functions to prevent wind buffeting noise. The inclination of the deflection member may be readily adjusted to deflect air passing over the sunroof into the interior of the vehicle. The deflection assembly may be employed in combination with a pivotally mounted sunroof panel forming an air scoop along the forward edge of the panel; air entering the scoop may be directed by the deflection member to a desired area within the vehicle.

8 Claims, 14 Drawing Figures

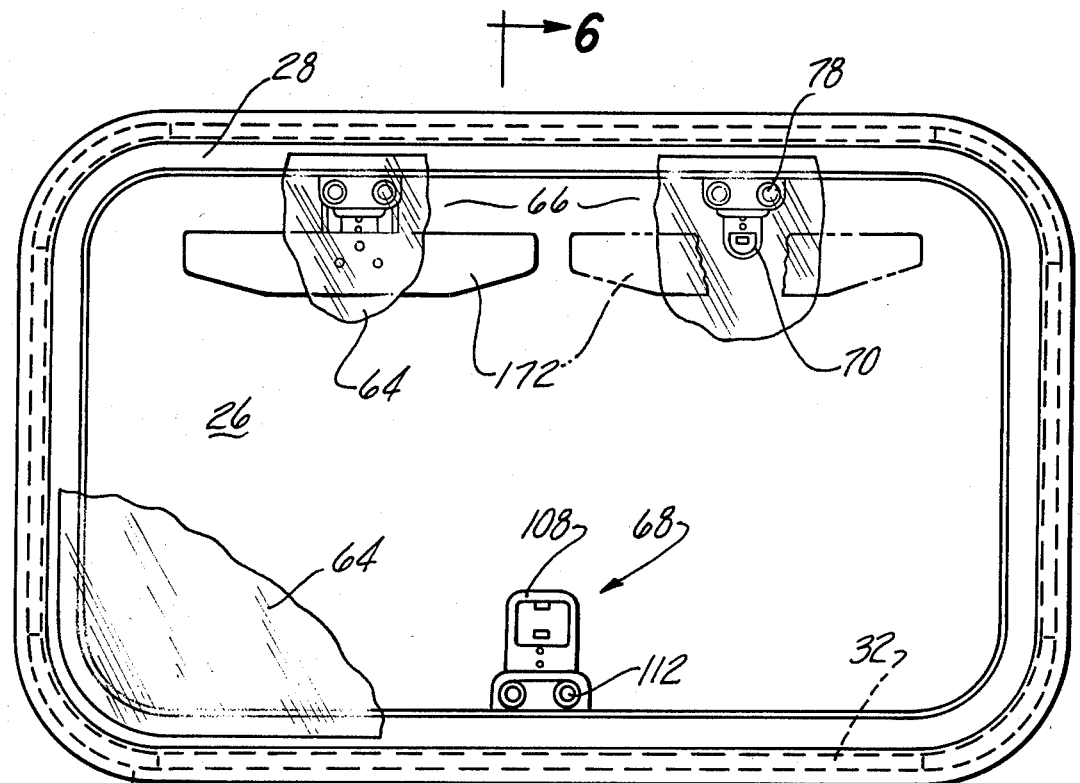
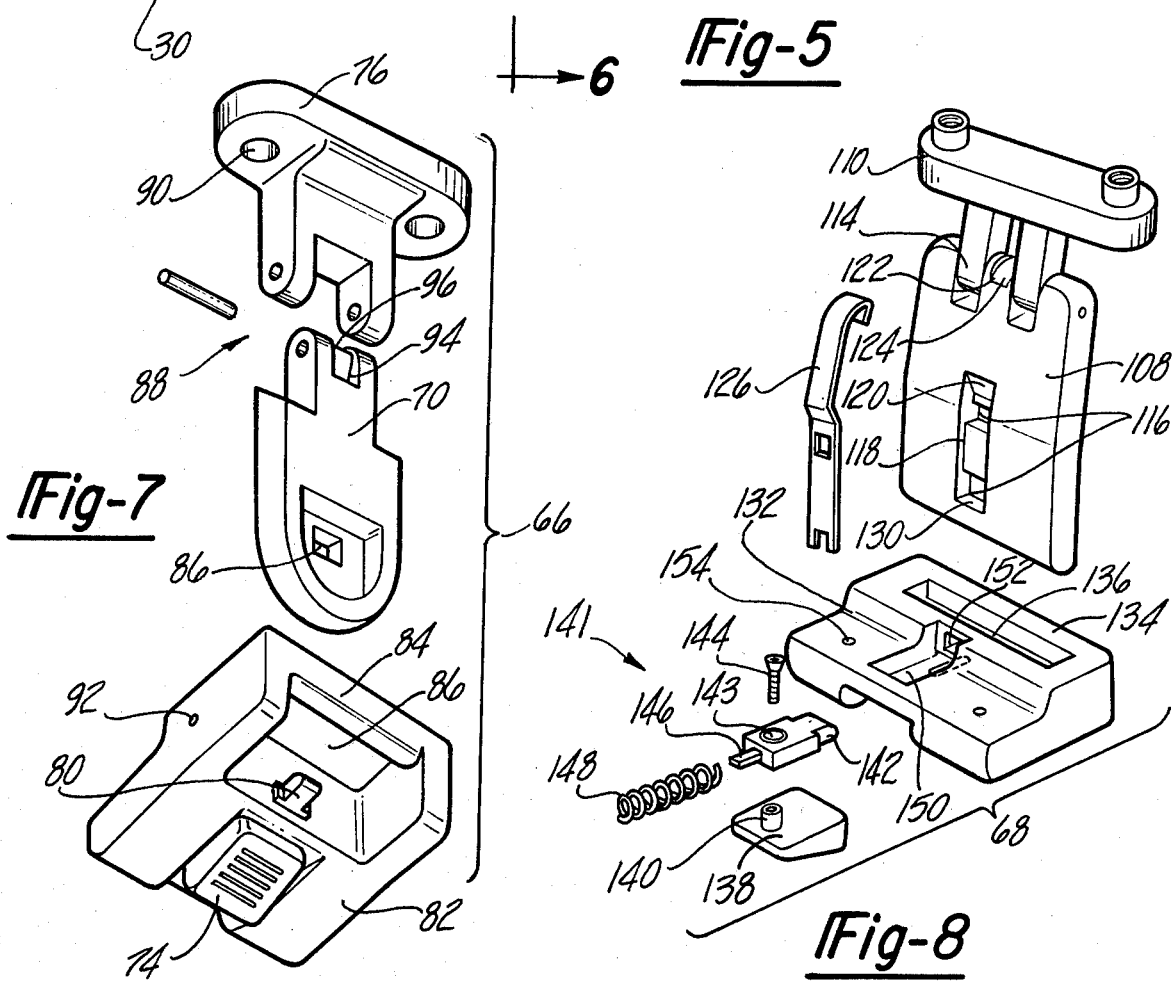

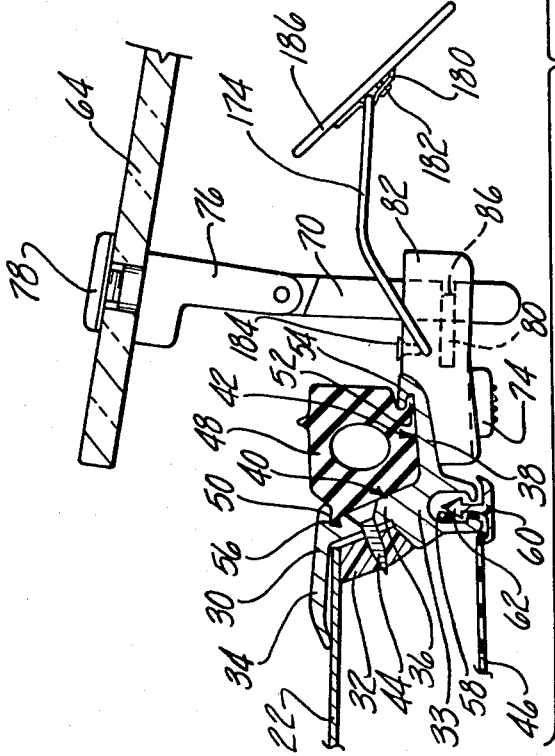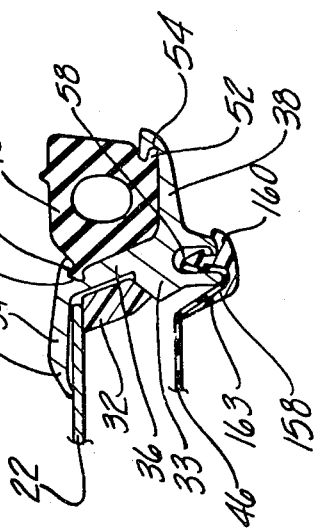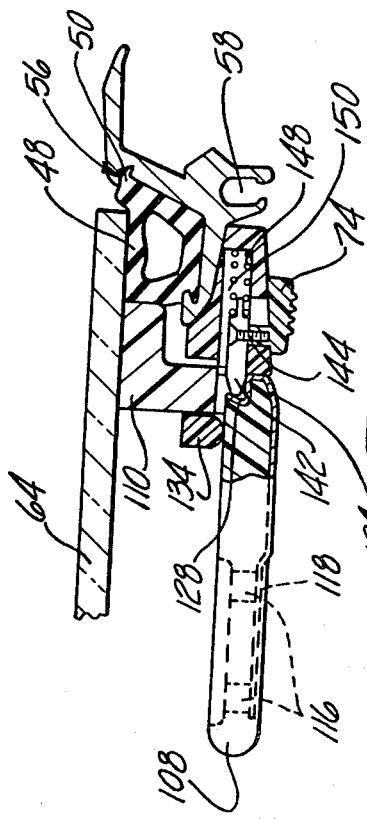

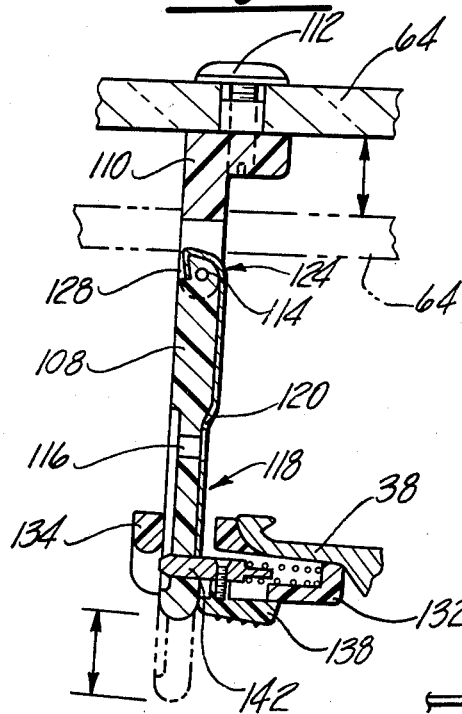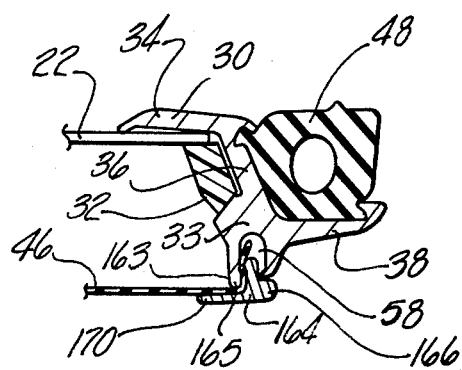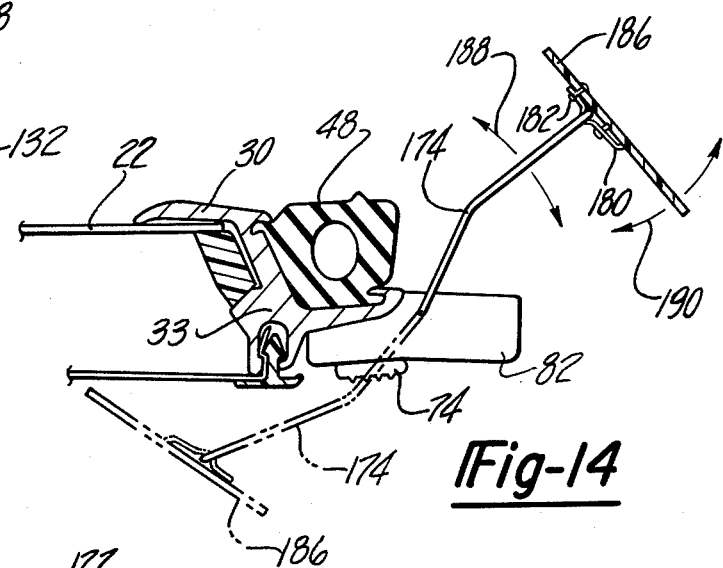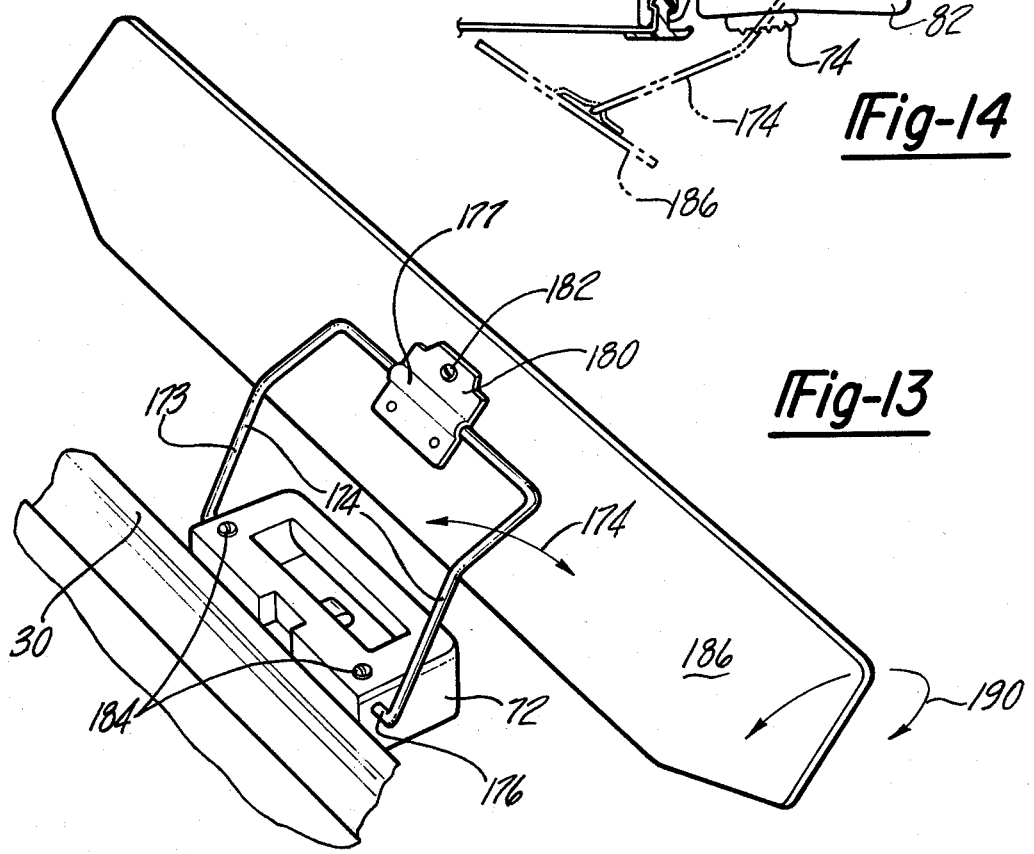

AIR DEFLECTION ASSEMBLY FOR VEHICLE SUNROOFS

TECHNICAL FIELD

The present invention generally relates to air deflectors for use with vehicles, and deals more particularly with an air deflection assembly particularly adapted for use with a vehicle having a sunroof.

BACKGROUND ART

Sunroofs for vehicles have become increasingly popular in recent years because they not only allow additional sunlight to enter the vehicle, but also act to ventilate the vehicle. Heretofore, the amount of sunroof ventilation could not be readily adjusted since the amount of outside air entering the vehicle through the sunroof opening depended essentially on the size of the opening and the contour of the vehicle's roof.

Another problem associated with previous sunroofs is that of wind buffeting noises caused by air flowing over the sunroof opening which creates an irritating buffeting effect within the vehicle's interior. Previous attempts to eliminate this buffeting problem have involved the provision of a relatively small deflector secured along the roof immediately forward of the leading edge of the sunroof opening. These deflectors, some of which were pivotally mounted along their forward edge to the roof, were successful in deflecting the oncoming air a sufficient degree to eliminate buffeting. Other types of these prior art deflectors were stationarily mounted on the roof and were therefore unsightly. In any event, none of the known prior art air deflectors for sunroofs are suitable for use with sunroof installations of the type having a removable sunroof panel. Moreover, none of the known prior art deflectors was capable of deflecting air into the interior of the vehicle through the sunroof opening, but rather functioned to provide an opposite result, i.e., deflecting air away from the sunroof opening.

DISCLOSURE OF THE INVENTION

An air deflection assembly for use with a vehicle having an opening in the roof thereof includes a substantially planar, air deflecting member extending transversely relative to the forward edge of the opening, and is mounted in spaced relationship to such forward edge by a support. The support has the opposite extremities thereof respectively pivotally connected to the roof and the deflection member to permit adjustment of both the elevation and inclination of the deflection member. The deflection member may be disposed above roof level to deflect air away from the sunroof opening, thereby to prevent buffeting noises, or may be inclined at a position either above or below the roof in order to direct oncoming air through the sunroof opening into the interior of the vehicle. The deflection member is substantially planar and may extend transversely across only a portion of the length of the forward edge of the sunroof opening.

These and further features of the invention will become clear or will be made apparent during the course of the following description of a preferred embodiment thereof.

BRIEF DESCRIPTION OF THE DRAWINGS

In the drawings which form an integral part of the specification and are to be read in conjunction therewith, and in which like components are designated by identical reference numerals in the various views:

FIG. 5 is an enlarged, plan view of the sunroof shown in FIG. 1, parts of the sunroof panel being broken away to reveal the front and rear mounting means;

FIG. 6 is a sectional view taken along the line 6—6 in FIG. 5;

FIG. 7 is an exploded perspective view of one of the front mounting means;

FIG. 8 is an exploded perspective view of the rear mounting means;

FIG. 9 is a cross-sectional view taken through the rear mounting means, showing the roof panel and lever handle in their open, latched position of maximum elevation, the intermediate open, latched position thereof being indicated in the phantom;

FIG. 10 is a cross-sectional view similar to FIG. 9 but showing the rear mounting means in a closed, latched position;

FIG. 11 is a cross-sectional view through the molding assembly depicting an alternate form of the headliner retainer;

FIG. 12 is a view similar to FIG. 11 but showing still another form of the headliner retainer;

FIG. 13 is a fragmentary, perspective view of the air deflection assembly, showing the air deflector in an elevated position above the sunroof opening; and FIG. 14 is a side elevational view of the deflector assembly shown in FIG. 13, an alternate position of the deflector member being shown in the phantom.

DESCRIPTION OF THE PREFERRED EMBODIMENT

Figure 1:
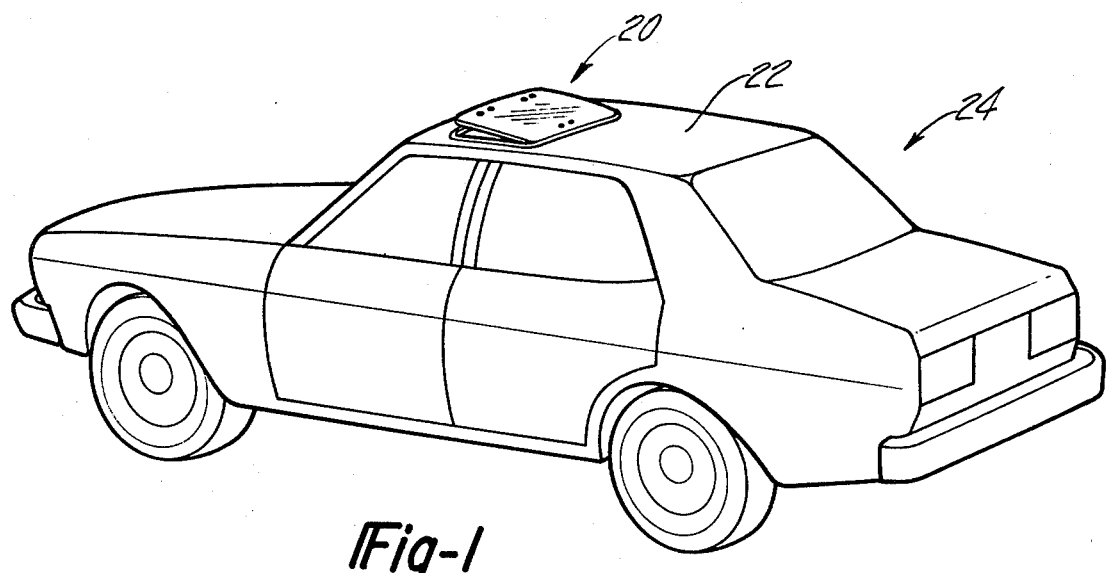
FIG. 1 is a perspective view of a vehicle having the removable sunroof which forms the preferred embodiment of the present invention installed in the roof thereof, the sunroof panel having been operated to the scoop position thereof.
Figure 2:
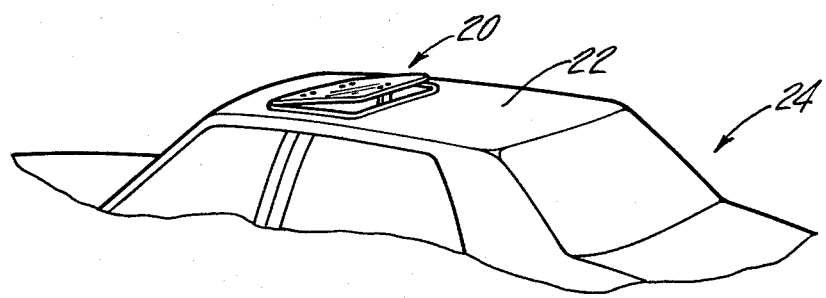
FIG. 2 is a view similar to FIG. 1 but showing the sunroof panel in the vent position thereof.

Referring now to the drawings, the present invention broadly relates to a sunroof assembly 20 adapted to be installed within a rectangular shaped opening 26 in the roof 22 of a vehicle 24. The sunroof assembly 20 includes a molding assembly 28 circumscribing the perimeter of the opening 26 and includes a frame 30.

Frame 30 comprises a first essentially planar section 34 disposed in overlying relationship to the periphery of the roof 22 surrounding opening 26, and further includes second and third sections 36 and 38 respectively disposed below roof 22. The second section 36 includes a surface 40 which extends downwardly away from first section 34 and inwardly into the opening 26. The third section 38 is provided with a surface 42 contiguous to surface 40 which extends away from the latter into the opening 26. Second and third sections 36 and 38 are provided with a pair of corresponding, V-shaped grooves 56 and 54 for captively holding a pair of ribs 50 and 52 respectively of a compressible, resilient seal 48 which extends around the periphery of the opening 26 and conformingly engages surfaces 40 and 42.

A retaining strip 32 of substantially rigid material is wedge-shaped in cross section and is operative to clamp the periphery of the roof 22 surrounding opening 26 against the interior surface of the first section 34 of the frame 30 by means of screws 44 extending through the second section 36. The retaining strip 32 extends continuously essentially the entire length of each side of the frame 30.

Frame 30 further includes structure 33 adjacent the juncture of second and third sections 36 and 38 provided with a slot 58 therein extending around the frame 30 for receiving an arrow-shaped leg 62 of a T-shaped headliner retainer strip 60. Retainer strip 60 is operative to clamp the periphery of a headliner 46 surrounding the opening 26 against the frame 30 to provide a clean finished appearance of the sunroof installation within the vehicle 24.

A sunroof panel 64, which may be of opaque or transparent material, such as glass, is adapted to overlie the sunroof opening 26 and engages the upper surface of seal 48. Panel 64 is mounted to the molding assembly 28 by a pair of spaced apart, front mounting means 66 disposed along the leading edge of frame 30, and rear mounting means 68 centrally located along the rear edge of frame 30.

Each of the front mounting means 66 comprises a latching mechanism including a tongue-shaped lever handle 70 and a latching mechanism 82. Lever handle 70 has one end thereof mounted by means of a pin and clevis 88 to a mounting block 76. Mounting block 76, in turn is provided with a pair of apertures 90 for receiving corresponding screws 78 which secure the mounting block 76 within apertures along the leading edge of panel 64. Lever handle 70 includes a guide groove 96 on one side thereof which extends around one end of lever handle 70 and into communication with a notch 94 in the opposite side of such handle 70. Lever handle 70 also includes a depression in the nature of a latching hole 86 therethrough in spaced relation to the pin and clevis 88. A latching guide slot 102 in one side of handle 70 communicates with hole 86 and is longitudinally aligned with the guide groove 96. One end of slot 102 adjacent guide groove 96 terminates in a ramp 104, while the other end thereof extends essentially perpendicular to the length of slot 102, thereby to define a stop 106. The lever handle 70 may be made of rigid plastic material, in which case a metal insert 100 is provided which extends from the notch 94, through guide groove 96, thence through slot 102 to prevent wear on handle 70 by a later discussed latching member.

The latching assembly 82 comprises a latching block 72 which is secured to the underside of frame 30 by means of screws extending through the third section 38 of frame 30 into latching block 72. Latching block 72 includes an opening 86 therein aligned with the vertical path of travel of lever handle 70 and defines a pivot bar 84. A latching member 80 extends through an aperature in the latching block 72 into the opening 86 and is biased into sliding engagement with the lever handle 70 by means of a later discussed spring. Latching member 80 may be shifted away from lever handle 70 into a slot within block 82 by means of a release button 74.

The rear mounting means 68, as best seen in FIGS. 8 and 9, comprises a latching member quite similar to the front mounting means 66 shown in FIG. 7. The rear mounting means 68 includes a lever handle 108 pivotally connected by a pin and clevis 114 to a mounting block 110, which is in turn secured to the panel 64 by means of screws 112. Lever handle 108 includes a notch 128 on one side thereof adjacent the pin and clevis 114, as well as a guide groove 122 which defines an arcuately-shaped camming surface 124 on the other side of handle 108 which extends around one end thereof and communicates with notch 128. Handle 108 also includes a pair of depressions in the nature of spaced apart latch holes 116 which are aligned with guide groove 122 as well as a slot 118 which connects the latch holes 116. Slot 118 is provided with a ramp surface 120 at one end thereof adjacent guide grooves 122, and a stop 130 at the opposite end thereof immediately adjacent the free extremity of handle 108. Handle 108 is slightly wider than handles 70.

A latching assembly 141 which is essentially identical in construction to latching assembly 82, includes a latching block 132 having an opening 136 therein to define a pivot bar 134. Block 132 is secured to the lower surface of the frame 30 by means of screws passing through the third section 38 of frame 30 and into apertures 134 of block 132. Block 132 also includes a slot 150 terminating in an opening 152 communicating with the opening 136 for receiving a latching member 142 and associated biasing spring 148. One outer extremity of latching member 142 extends outwardly through opening 152, while the opposite extremity thereof is provided with an extension 146 adapted to allow the spring 146 to be sleeved thereover. A screw 144 passing through aperture 143 in latching member 142 is secured within an extension 140 of a release button 138, thereby to secure button 138 to latching member 142.

In use, the lever handle 108 is inserted into opening 136 of latching block 132 and release button 138 is operated to retract latching member 142 away from opening 152. As handle 108 enters opening 136, button 138 may be released whereupon latching member 142 is biased into sliding engagement with one side of handle 108. Latching member 142 slidably engages handle 108 until brought into registration with the lower latching hole 116 whereupon the latching member extends into such hole, thereby preventing movement of handle 108 relative to latching assembly 141. In the position just described, the rear of the panel 64 is latched in the uppermost, open position thereof as shown in FIG. 9. The panel 64 may be shifted to an intermediate open position by retracting the release button 138 and drawing lever handle 108 downwardly until the upper latching hole 116 registers with latching member 142; during this period of adjustment, the latching member 142 is retained within slot 118. The rear portion of panel 64 may then be closed by again retracting the latching member 142 from the upper hole 116 by means of release button 138 and drawing handle 108 downwardly; when latching member 142 clears the upper latching hole 116, button 138 may be released whereupon latching member 142 rides on the metal insert 126 into the guide groove 122. When handle 108 reaches its lowermost position relative to latching block 138, handle 108 is pivoted in a clockwise position, as viewed in FIG. 9, thereby causing one side of handle 108 adjacent the pin and clevis 114 to engage the pivot bar 134. With pivot bar 134 acting as a fulcrum for the major length of handle 108, continued pivotal movement of handle 108 causes the latching member 142 to be cammed into the notch 128 by camming surface 124, thereby positively latching handle 108 in a latched position. The lever-like action of handle 108 draws the panel 64 downwardly against the resilient force imposed thereon by the seal 48, thereby producing a weather-tight closure between panel 64 and seal 48.

To release the handle 108 from the closed, latched position, handle 108 is pivoted in a counterclockwise direction, as viewed in FIG. 9 whereupon, latching member 142 is automatically cammed over the end of guide groove 122 by camming surface 124 until handle 108 is vertically aligned with opening 136 and latching block 132. The rear position of panel 64 may then be raised; as panel 64 is raised, latching member 142 slides within guide groove 122 and downwardly on ramp surface 120 into slot 118, thence into the upper latching hole 116. Retraction of latching member 142 by release button 138 permits further elevation of panel 64, but the stop 130 prevents inadvertent removal of handle 108 from latching block 132 unless the latching member 142 is completely retracted by release button 138 so as to clear stop 130.

The operation of each of the front mounting means 66 is essentially identical to that described with reference to the rear mounting means 68, except that only one open position is provided for the forward portion of panel 64.

From the foregoing, it may be readily appreciated that panel 64 may be disposed in a plurality of operating positions, as is depicted in FIGS. 1-4. With the rear mounting means 68 in the closed, latched position thereof, the front mounting means 66 may be operated to the open position thereof, thereby elevating the front of the panel 64 above the roof 22 to form an air scoop. Alternatively, the front mounting means 66 may remain in a closed latched condition, and the rear mounting means 68 may be operated to one of the open elevational positions thereof, thereby elevating only the rear of the panel 64 to provide a vent. It is to be noted that both the front and rear mounting means 66 and 68 respectively provide a pivotal connection between the panel 64 and the molding assembly 28 so as to allow either the front or rear of panel 64 to be pivoted when the corresponding latching means 66 or 68 is in the closed, latched position thereof.

Figure 3:
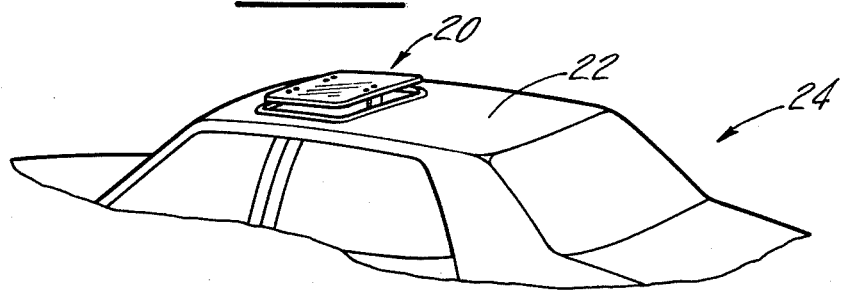
FIG. 3 is a view similar to FIGS. 1 and 2 but depicting the entire sunroof panel in an elevated position.
Figure 4:
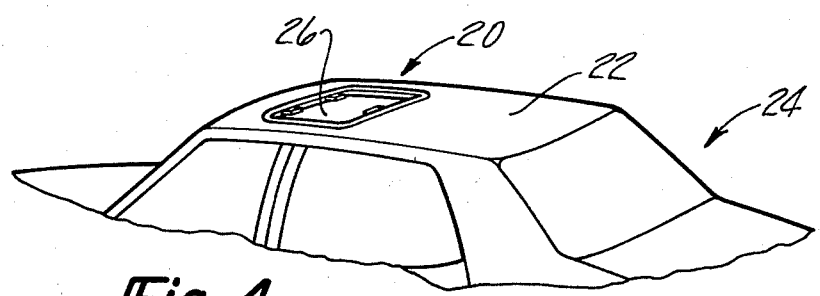
FIG. 4 is similar to FIGS. 1-3 but showing the sunroof panel removed from the vehicle.

The entire panel 64 may be elevated, if desired, as shown in FIG. 3 by operating both the front and rear mounting means 66 and 68 to the open positions thereof. Finally, the panel 64 may be completely removed from the opening 26, as shown in FIG. 4, by removing the lever handles 70 and 108 from the corresponding latching assemblies 82 and 141.

Attention is now directed to FIG. 11 wherein an alternate form of a headliner retainer 156 is depicted. Retainer 156 may comprise a strip of resilient, but relatively rigid material, as of plastic, and includes an arrow-shaped leg 158 captively held within the slot 58. A first flange 160 is disposed in overlying relationship to one side of the structure defining slot 58 adjacent the third section 38 of frame 30. A second upwardly turned flange 162 extends outwardly away from the opening 26 and upwardly toward roof 22, thereby to clamp headliner 46 against a surface 163; flange 162 maintains headliner 46 in an elevated position and may be employed in vehicles having reduced clearance between headliner 46 and roof 22.

Still another form of headliner retainer 164 is depicted in FIG. 12. Retainer 164 may be manufactured of rigid material such as metal, and includes a hook-shaped extension 168 extending into slot 58, thereby to hook an edge of the headliner 46 on a ledge 165 of the frame 30. Retainer 164 further includes a pair of oppositely extending flanges 166 and 170 beneath the hook-shaped extension 168 to form an aesthetic transition between the headliner 46 and frame.

Attention is now particularly directed to FIGS. 13 and 14 wherein a novel air deflection assembly is depicted. The deflector assembly 172 comprises a generally rectangular deflection member 186 made of rigid material such as metal or glass. Deflection member 186 may be transparent if desired, however, appropriate tinting is applied thereto whereby deflection member 186 may also function as a sun visor.

Deflection member 186 is pivotally mounted in spaced relationship to the leading edge of opening 26 by means of a U-shaped support 173 comprising a pair of essentially parallel angularly shaped rods 174 and a leg 178 connecting one set of extremities of rods 174. The opposite ends of rods 174 are provided with inwardly directed extensions 176 which are pivotally received within apertures 92 on opposite sides of latching block 72, thereby pivotally mounting the deflection member 186 for swinging movement about a first transversely extending axis for swinging movement through an angular displacement of at least 90°.

Leg 178 is captively held for pivotal movement between a U-shaped trough 177 of a mounting plate 180 and the deflection member 186. The relative pressure applied to leg 178 by plate 180 may be adjusted by means of a screw 182 extending through plate 180 and into member 186, which varies the pressure applied by plate 180 to leg 178. It may be thus appreciated that mounting plate 180 mounts deflection member 186 on leg 178 for pivotal movement for almost 180° of rotation about a second transversely extending axis, spaced from the first axis mentioned above. It may be further appreciated that deflection member 186 may be pivoted about the first axis through extensions 176, and in the direction of the arrows 188 to adjust the elevation thereof relative to the roof 22. Further, deflection member 186 may be pivoted about the second axis through leg 178 to permit adjustment of the inclination thereof in the direction of the arrows 190, relative to the oncoming air flowing over roof 22.

As previously noted, deflection member 186 may be employed as a sun visor for shielding occupants of the vehicle 24 from the sun's rays passing through the opening 26. More importantly, however, the deflection member 186 may be disposed in a position similar to that shown in FIG. 13 in order to deflect a portion of the oncoming air upwardly and away from the opening, thereby to prevent buffeting of the wind within the opening 26, which is annoying to the vehicle's occupants. Finally, the deflection member 186 may be inclined as shown in FIG. 14 in order to scoop or deflect a portion of the air flowing over the roof 22 through the opening 26 into the interior of the vehicle 24. The amount of air thus deflected may be adjusted by varying either the elevation and/or the inclination of deflection member 186. When not in use, deflection member 186 may be pivoted downwardly and forwardly into adjacency with the headliner 46, out of the view of the driver or other occupants.

It is to be noted that the deflection assembly 172 may be advantageously employed in combination with the sunroof assembly 20 previously described if desired. For example, the forward portion of the panel 64 may be elevated to act as a scoop, and the deflection member 186 may be positioned adjacent the opening between the panel 64 and roof 22 in order to direct the incoming air to a desired location within the interior of the vehicle 24. It is to be noted that the ease with which the rods 173 may be pivoted about latching block 72 may be adjusted by means of set screws 184 which bear against extensions 176.

From the foregoing, it is apparent that the air deflection assembly described above not only provides for the reliable accomplishment of the objects of the invention but does so in a particularly simple and economical manner. It is recognized, of course, that those skilled in the art may make various modifications or additions to the preferred embodiment chosen to illustrate the invention without departing from the scope and spirit of the present contribution to the art. Accordingly, it is to be understood that the protection sought and to be afforded hereby should be deemed to extend to the subject matter claimed and all equivalents thereof fairly within the scope of the invention.

What is claimed is:

1. An air deflection assembly for use with a vehicle having a sunroof opening in the roof thereof, comprising:
    an air deflecting member extending transverse to said opening for deflecting air flowing over said roof and through or over said opening; and
    mounting means for mounting said deflecting member adjacent the leading edge of said opening for independent pivotal movement about first and second transversely extending axes, whereby to permit adjustment of both the elevation and inclination of said deflecting member.

2. The deflection assembly of claim 1, wherein the air deflecting member is substantially planar and said mounting means includes an elongate support having one end thereof pivotally connected to medial regions of one planar face of said planar member.

3. The deflection assembly of claim 2, wherein the other end of said support is adapted to be pivotally connected to said roof adjacent said leading edge thereof.

4. The deflection assembly of claim 1, wherein said deflecting member is elongate and possesses a length substantially less than the length of said leading edge of said opening.

5. The deflection assembly of claim 3, wherein said first axis extends through one end of said support, said second axis extends through the other end of said support and remains essentially stationary relative to said roof, and said first axis pivots about said second axis upon pivoting of said support relative to said leading edge.

6. Ventilation apparatus for use with a vehicle having an opening in the roof thereof and a cover movably mounted over said opening to selectively allow air to enter said vehicle through said opening, comprising:
    latch means along one edge of said opening for securing said cover to said roof over said opening, said latch means including a first portion carried by said cover and a second portion extending laterally from said edge and partially into said opening, said first and second portions being interengagable for latching said cover in a predetermined position relative to said opening;
    air deflecting means extending generally parallel to said one edge for deflecting air flowing across said roof through said opening; and
    mounting means connected to said deflecting means for shiftably mounting said deflecting means in spaced relationship to said one edge, said mounting means including an elongate support having one end thereof connected to said air deflecting means, the other end of said support being pivotally connected to said second portion of said latch means at a location spaced from said one edge.

7. The ventilation apparatus of claim 6, wherein said second portion of said latch means includes a block having a first aperture therein and other end of said support is journalled for rotational movement with said aperture.

8. The ventilation apparatus of claim 7, wherein said block includes a second aperture therein, said first and second apertures being defined in opposite sides of said block, and said support includes a pair of spaced apart arms respectively associated with said first and second apertures and having one extremity thereof journalled for rotation in said first and second apertures.

* * * * *